United States Patent
Jos et al.

(10) Patent No.: US 9,887,869 B2
(45) Date of Patent: Feb. 6, 2018

(54) METHOD OF COMPENSATING CARRIER FREQUENCY OFFSET IN RECEIVERS

(71) Applicant: SAMSUNG ELECTRONICS CO., LTD., Suwon-si (KR)

(72) Inventors: Sujit Jos, Bangalore (IN); Kiran Bynam, Jalahalli (IN); Jinesh P Nair, Bangalore (IN); Ashutosh Deepak Gore, Bangalore (IN); Chandrashekhar Thejaswi Ps, Bangalore (IN); Chang Soon Park, Chungju-si (KR); Young Jun Hong, Seoul (KR); Youngsoo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/487,937

(22) Filed: Apr. 14, 2017

(65) Prior Publication Data

US 2017/0324602 A1  Nov. 9, 2017

(30) Foreign Application Priority Data

May 6, 2016   (IN) .............................. 201641015928
Jan. 16, 2017  (KR) ........................ 10-2017-0007241

(51) Int. Cl.
*H04L 27/06*   (2006.01)
*H04L 27/26*   (2006.01)
(Continued)

(52) U.S. Cl.
CPC ........ *H04L 27/2657* (2013.01); *H04L 25/022* (2013.01); *H04L 2027/0026* (2013.01)

(58) Field of Classification Search
CPC .............. H04L 27/2657; H04L 27/266; H04L 2027/0065; H04L 27/2656; H04L 27/2662;
(Continued)

(56) References Cited

U.S. PATENT DOCUMENTS 7,260,360 B2   8/2007   Seo et al.
7,558,346 B2   7/2009   Min et al.
(Continued)

FOREIGN PATENT DOCUMENTS

EP   2 232 806 A1   9/2010
KR   10-0631895 B1   7/2006
(Continued)

OTHER PUBLICATIONS

Minn Hlaing, Vijay K. Bhargava, and Khaled Ben Letaief. "A robust timing and frequency synchronization for OFDM systems." IEEE transactions on wireless communications 2.4 (2003): 822-839.
(Continued)

*Primary Examiner* — Khanh C Tran
(74) *Attorney, Agent, or Firm* — NSIP Law

(57) ABSTRACT

A method to compensate a carrier frequency offset (CFO) in a receiver is disclosed. The method includes receiving discrete time samples, obtaining a sample vector from the received discrete time samples, obtaining tentative CFO estimates based on the sample vector, selecting a CFO having a greatest compensation coefficient from the tentative CFO estimates, and compensating the CFO in the received discrete time samples.

23 Claims, 5 Drawing Sheets

(51) Int. Cl.
*H04L 25/02* (2006.01)
*H04L 27/00* (2006.01)

(58) Field of Classification Search
CPC .............. H04L 27/2675; H04L 27/2655; H04L 27/2663; H04L 7/0016; H04B 1/7075; H04B 1/7183; H03L 7/091
See application file for complete search history.

(56) References Cited

U.S. PATENT DOCUMENTS

| | | | |
|---|---|---|---|
| 8,503,504 B2 | 8/2013 | Dehmas | |
| 8,576,963 B2 | 11/2013 | Chang et al. | |
| 8,744,031 B1* | 6/2014 | Kim | H04L 7/0016 342/188 |
| 2005/0058224 A1* | 3/2005 | Alagha | H04B 7/18523 375/316 |
| 2008/0095249 A1* | 4/2008 | Yoon | H04L 27/2659 375/260 |
| 2008/0260076 A1 | 10/2008 | Lai et al. | |
| 2012/0237204 A1* | 9/2012 | Zhou | H04B 10/0795 398/25 |
| 2013/0021977 A1 | 1/2013 | Yang et al. | |
| 2013/0114453 A1 | 5/2013 | Hung et al. | |
| 2014/0112378 A1 | 4/2014 | Ji et al. | |
| 2014/0177764 A1 | 6/2014 | Tetzlaff | |
| 2014/0269389 A1 | 9/2014 | Bukkfejes et al. | |
| 2014/0293911 A1 | 10/2014 | Cheong et al. | |
| 2015/0229505 A1 | 8/2015 | Porat et al. | |
| 2016/0381581 A1* | 12/2016 | Stanciu | H04L 5/0048 370/252 |

FOREIGN PATENT DOCUMENTS

| | | |
|---|---|---|
| KR | 10-2015-0038925 A | 4/2015 |
| KR | 10-2015-0082233 A | 7/2015 |
| WO | WO 2009/075898 A1 | 6/2009 |

OTHER PUBLICATIONS

Horlin, François, and André Bourdoux. "Digital compensation for analog front-ends: a new approach to wireless transceiver design." John Wiley & Sons, XP002772569, (2008): 153.
Callaway, Edgar H., et al., "IEEE Standard for Low-Rate Wireless Personal Area Networks (WPANs)—Amendment 2: Ultra-Low Power Physical Layer; IEEE" 802.15. 4. IEEE Standards Association, (2016): 1-52, XP068106584.
Extended European Search Report dated Aug. 8, 2017 in corresponding European Patent Application No. 17169433.4 (14 pages in English).

* cited by examiner

METHOD OF COMPENSATING CARRIER FREQUENCY OFFSET IN RECEIVERS

CROSS-REFERENCE TO RELATED APPLICATIONS

This application claims the benefit under 35 USC §119(a) of Indian Patent Application No. 201641015928 filed on May 6, 2016, in the Indian Patent Office and Korean Patent Application No. 10-2017-0007241 filed on Jan. 16, 2017, in the Korean Intellectual Property Office, the entire disclosures of which are incorporated herein by reference for all purposes.

BACKGROUND

1. Field

The following description relates to a wireless communication system, and more particularly, to a mechanism for compensating a carrier frequency offset (CFO) in a receiver.

2. Description of Related Art

In a wireless communication system, signal demodulation in a receiver may be affected by a carrier frequency offset (CFO). In general, a CFO may result from a mismatch between a local oscillator (LO) frequency in a transmitter configured to up-convert a baseband signal to a passband signal and an LO frequency in a receiver configured to down-convert the received passband signal to a baseband signal. For example, such a CFO may occur in a wireless sensor network in addition to a multi-user multi-antenna communication system.

Such a mismatch may result in a deviation of values in received samples, and thus demodulation of a given symbol may result in an erroneous decision. Further, the CFO may result in each of samples multiplied by a complex phasor. The CFO may be accumulated in symbol demodulation, and more adversely affect the demodulation as a data length increases. In addition to an influence on demodulation of baseband data, the mismatch may also change desired properties of a received preamble. Thus, synchronization and other operations based on the received preamble may be affected.

Thus, there is a desire for a simple and robust mechanism for estimating a CFO and compensating the CFO in a receiver.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a method to compensate a carrier frequency offset (CFO) in a receiver, the method includes receiving discrete time samples, obtaining a sample vector from the received discrete time samples, obtaining tentative CFO estimates based on the sample vector, selecting a CFO having a greatest compensation coefficient from the tentative CFO estimates, and compensating the CFO in the received discrete time samples. Each of the tentative CFO estimates is associated with a compensation coefficient.

The obtaining of the sample vector may include obtaining sliding vectors from the received discrete time samples, dividing each of the sliding vectors into at least four sub-blocks, obtaining a correlation coefficient for each of the sliding vectors based on the at least four sub-blocks, and selecting, as the sample vector, a sliding vector having a greatest correlation coefficient from the sliding vectors.

The correlation coefficient for each of the sliding vectors may be obtained by adding an absolute value of a dot product between a first sub-block and a fourth sub-block and an absolute value of a dot product between a second sub-block and a third sub-block.

The obtaining of the tentative CFO estimates may include obtaining angles corresponding respectively to the tentative CFO estimates, and dividing a corresponding angle by a denominator term.

The method may further include obtaining a sub-period by identifying similar elements and elements of an opposite polarity being separated by a time duration equal to the sub-period, and obtaining, as the denominator term, a product of a multiplication of a numerical value 2, pi ($\pi$), and the sub-period.

The obtaining of the angles may include obtaining, as a first angle of the angles, an angle between elements of the sample vector, obtaining, as a second angle of the angles, a negative value opposite to the first angle, and obtaining a remaining angle of the angles excluding the first angle and the second angle based on a preamble angle. The preamble angle refers to an angle between samples separated from one another by a time duration equal to a preamble period.

The selecting of the CFO may include obtaining corresponding compensated vectors by compensating the sample vector using the tentative CFO estimates, obtaining compensation coefficients corresponding respectively to the corresponding compensated vectors, and selecting, as the CFO, one of the tentative CFO estimates for a corresponding compensated vector having a greatest compensation coefficient from the tentative CFO estimates.

The obtaining of the compensation coefficients may include obtaining first half compensation coefficients corresponding to a first half of the compensation coefficients by correlating first half compensated vectors with an oversampled preamble sequence, and obtaining second half compensation coefficients corresponding to a second half of the compensation coefficients by correlating second half compensated vectors with a cyclic shift sequence.

The oversampled preamble sequence may be obtained by repeating each element of a preamble oversampling ratio (OSR).

The cyclic shift sequence may be obtained as a cyclic shift of the oversampled preamble sequence by a half-period number of samples. Here, a half-period may be equal to a product of a multiplication of the OSR and a half of a preamble length.

A non-transitory computer-readable storage medium may store instructions to cause computing hardware to perform the method.

In another general aspect, a receiver comprises a processor configured to compensate a CFO, receive discrete time samples and obtain a sample vector from the received discrete time samples, obtain tentative CFO estimates based on the sample vector and select a CFO having a greatest compensation coefficient from the tentative CFO estimates, and compensate the CFO in the received discrete time samples. Here, each of the tentative CFO estimates is associated with a compensation coefficient.

The receiver may further comprise a block detector configured to receive the discrete time samples and obtain the sample vector from the received discrete time samples; a CFO estimator configured to obtain the tentative CFO estimates based on the sample vector and select the CFO having the greatest compensation coefficient from the tentative CFO estimates, wherein each of the tentative CFO estimates is associated with the compensation coefficient; and a CFO compensator configured to compensate the CFO in the received discrete time samples.

The processor may obtain sliding vectors from the received discrete time samples and divide each of the sliding vectors into at least four sub-blocks, obtain a correlation coefficient for each of the sliding vectors based on the at least four sub-blocks, and select, as the sample vector, at least one sliding vector having a greatest correlation coefficient from the sliding vectors.

The correlation coefficient may be obtained by adding an absolute value of a dot product between a first sub-block and a fourth sub-block and an absolute value of a dot product between a second sub-block and a third sub-block.

The CFO estimator may obtain the tentative CFO estimates by obtaining angles corresponding respectively to the tentative CFO estimates and dividing a corresponding angle by a denominator term.

The processor may obtain a sub-period by identifying similar elements and elements of an opposite polarity being separated by a time duration equal to the sub-period, and obtain, as the denominator term, a product of a multiplication of a numerical value 2, pi ($\pi$), and the sub-period.

The processor may obtain an angle between elements of the sample vector as a first angle of the angles and a negative value opposite to the first angle as a second angle of the angles, and obtain a remaining angle of the angles excluding the first angle and the second angle based on a preamble angle. The preamble angle refers to an angle between samples separated from one another by a time duration equal to a preamble period.

The processor may obtain corresponding compensated vectors by compensating the sample vector using the tentative CFO estimates, obtain compensation coefficients corresponding respectively to the corresponding compensated vectors, select, as the CFO, one of the tentative CFO estimates for a corresponding compensated vector having a greatest compensation coefficient, and compensate for the received discrete time samples using the CFO.

The processor may obtain first half compensation coefficients of the compensation coefficients by correlating first half compensated vectors with an oversampled preamble sequence, and second half compensation coefficients of the compensation coefficients by correlating second half compensated vectors with a cyclic shift sequence.

The oversampled preamble sequence may be obtained by repeating each element of a preamble OSR.

The cyclic shift sequence may be obtained as a cyclic shift of a distributed preamble sequence by a half-period number of samples.

The receiver may be in compliance with an Institute of Electrical and Electronics Engineers (IEEE) 802.15.4q standard.

The receiver may further include a memory storing instructions to implement the processor to receive the discrete time samples and obtain the sample vector from the received discrete time samples; obtain the tentative CFO estimates based on the sample vector and select the CFO having the greatest compensation coefficient from the tentative CFO estimates, wherein each of the tentative CFO estimates is associated with the compensation coefficient; and compensate the CFO in the received discrete time samples.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
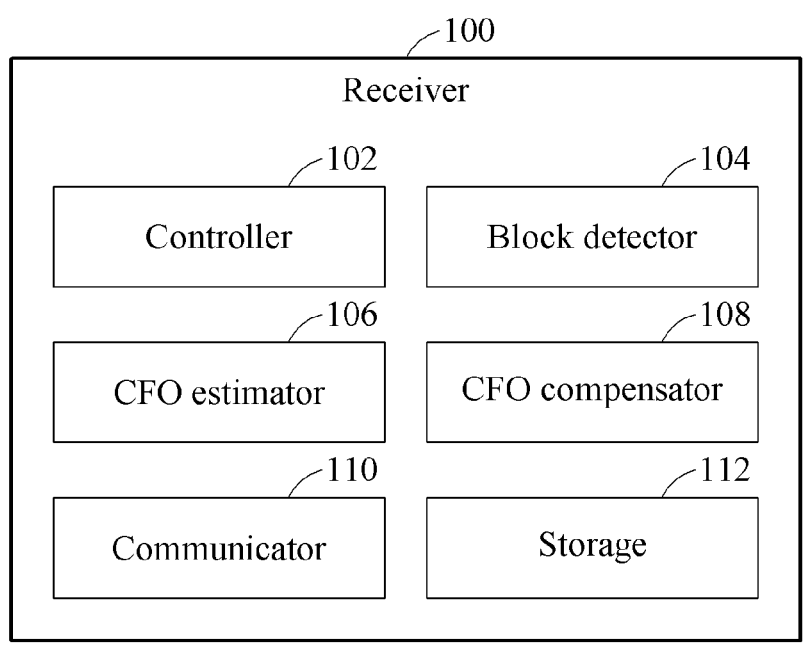
FIG. 1 is a diagram illustrating an example of a configuration of a receiver configured to compensate a carrier frequency offset (CFO).

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In an example, a baseband signal x(t) may be up-converted to a higher frequency carrier signal in a transmitter, e.g., the transmitter may up-convert the baseband signal x(t) to the higher frequency carrier signal, and transmit the higher frequency carrier signal. That is, a baseband signal may be up-converted to a desired carrier frequency, for example, $f_c$. The transmitted signal may be represented by Equation 1.

$$x'(t)=Re\{x(t)e^{j2\pi f_c t}\} \qquad \text{[Equation 1]}$$

A signal received by a receiver may be down-converted by a carrier frequency $f_c'$, and represented by Equation 2.

$$y(t)=(x'(t)+j\ HT\{x'(t)\})e^{-j2\pi f_c' t} \qquad \text{[Equation 2]}$$

In Equation 2, HT{x'(t)} denotes a Hilbert transform of a signal x'(t). In addition, $f_c'=f_c+\delta f$, in which $\delta f$ denotes a carrier frequency offset (CFO). That is, $\delta f$ denotes a difference between $f_c'$ and $f_c$. y(t) may also be represented by Equation 3.

$$y(t)=x(t)e^{-j2\pi\delta f t} \qquad \text{[Equation 3]}$$

In Equation 3, x(t) is multiplied by a phasor, for example, a complex number $e^{-j2\pi\delta f t}$, of which an angle increases in proportion to a time or an index of samples in an output of an analog-to-digital converter (ADC). The multiplying of x(t) by the phasor may affect demodulation of data symbols.

A CFO may be estimated using a periodicity of a preamble, e.g., a period T may be obtained from a preamble. The period T may be identified from received discrete time samples, and the following operations may be performed to obtain a CFO estimate.

Equation 4 may be first calculated.

$$y(t)\cdot y^*(t-T)=x(t)e^{-j2\pi\delta f t}x^*(t-T)e^{j2\pi\delta f(t-T)} \qquad \text{[Equation 4]}$$

Equation 4 may be represented by Equation 5.

$$y(t)\cdot y^*(t-T)=|x(t)|^2\cdot e^{-j2\pi\delta f T} \qquad \text{[Equation 5]}$$

In Equation 5, an angle of y(t)·y*(t−T) is equal to $2\pi\delta fT$. Thus, the angle of y(t)·y*(t−T) may be represented by Equation 6.

$$\angle\{y(t)\cdot y^*(t-T)\}=-2\pi\delta fT \qquad \text{[Equation 6]}$$

Thus, the CFO $\delta f$ may be represented by Equation 7.

$$\delta f=\frac{-\angle\{y(t)\cdot y^*(t-T)\}}{2\pi T} \qquad \text{[Equation 7]}$$

The angle of y(t)·y*(t−T) may have the following range.

$$\angle\{y(t)\cdot y^*(t-T)\} \text{ is from } -\pi \text{ to } \pi.$$

An estimative CFO range may be obtained by substituting a value of T for Equation 7, e.g., in a case of an Institute of Electrical and Electronics Engineers (IEEE) 802.15.4q standard receiver of which a preamble period, or a period of a preamble, is 32, a duration of the preamble may be 32 microseconds (µs). Here, by substituting a value of T, for example, 32 µs (T=32 µs), for Equation 7 and applying a range of the angle of y(t)·y*(t−T), the CFO range may be from −15.625 kilohertz (kHz) to 15.625 kHz (−½T, ½T).

However, an IEEE 802.15.4q standard requires that all CFOs be within a ±40 parts-per million (ppm) range, which indicates a range from −192 kHz to +192 kHz. That is, the receiver having the estimated CFO range of −15.625 kHz to 15.625 kHz may not comply with the IEEE 802.15.4q standard. Thus, a conventional method of estimating a CFO using Equation 7 above may not be effective in a case in which the CFO range does not satisfy a requirement of the standard or other similar cases or situations. In addition, although a conventional compensation method using Equation 7 uses continuous time signals, CFO estimation and compensation may be actually performed on discrete time samples of the signals.

Examples to be described hereinafter relate to a method of compensating a CFO in a receiver. Although described hereinafter, the examples may be used to overcome a limitation in a range, for example, −15.625 kHz to +15.625 kHz, and expand such a CFO range to a range of −250 kHz to +250 kHz. Thus, the receiver may be compatible with the IEEE 802.15.4q standard. The method may include receiving, by the receiver, discrete time samples. The received discrete time samples may include discrete time samples of continuous time baseband signals. The method may also include obtaining, by the receiver, a sample vector from the received discrete time samples. In addition, the method may also include obtaining, by the receiver, tentative CFO estimates based on the sample vector. Here, each of the tentative CFO estimates may be associated with a compensation coefficient. Further, the method may also include selecting, by the receiver, a CFO having a greatest compensation coefficient from the tentative CFO estimates. Further, the method may also include compensating, by the receiver, the selected CFO in the received discrete time samples.

In one example, the obtaining of the sample vector from the received discrete time samples may include obtaining sliding vectors from the received discrete time samples. The method may also include dividing each of the sliding vectors into at least four sub-blocks. Further, the method may also include obtaining at least one correlation coefficient for each of the sliding vectors based on the four sub-blocks. Further, the method may also include selecting, as the sample vector, a sliding vector having a greatest correlation coefficient from the sliding vectors.

The correlation coefficient may be obtained by adding an absolute value of a dot product between a first sub-block and a fourth sub-block, and an absolute value of a dot product between a second sub-block and a third sub-block. Each of the tentative CFO estimates may be obtained by dividing a corresponding angle by a product of a multiplication of a numerical value 2, a constant pi (π), and a sub-period. Although described hereinafter, the tentative CFO estimates may be obtained based on $$\delta f_{a_x}^h = \frac{-\varphi_{2,a_x}^h}{2\pi T_s}, \delta f_{c_x}^h = \frac{-\varphi_{2,c_x}^h}{2\pi T_s}.$$

In one example, the selecting of the CFO from the tentative CFO estimates may include the following operations:

The operations may include compensating the sample vector using the tentative CFO estimates to obtain a plurality of corresponding compensated vectors.

The operations may also include obtaining at least one compensation coefficient corresponding to each of the corresponding compensated vectors.

The operations may also include selecting, from the tentative CFO estimates, one of the tentative CFO estimates as the CFO for a corresponding compensated vector having a greatest compensation coefficient.

The operations may also include compensating for the received discrete time samples using the CFO.

In one example, the obtaining of the compensation coefficients may include obtaining a plurality of first half compensation coefficient of the compensation coefficients by correlating a plurality of first half compensated vectors with an oversampled preamble sequence, and obtaining a plurality of second half compensation coefficients of the compensation coefficients by correlating a plurality of second half compensated vectors with a cyclic shift sequence. Although described hereinafter, the receiver may obtain the first half compensation coefficients based on $$corr_{\delta f_{est}} = \sum_{n=1}^{N} r_{\delta f_{a_x}^h}^{a_x}(n) \cdot x_p^{OS}(n), \delta f_{est} \in \{\delta f_{a_x}^h, h \in [1, 3]\},$$

and the second half compensation coefficients based on $$corr_{\delta f_{est}} = \sum_{n=1}^{N} r_{\delta f_{a_x}^h}^{c_x}(n) \cdot x_{p+16OSR}^{OS}(n), \delta f_{est} \in \{\delta f_{c_x}^h, h \in [1, 3]\}.$$

In one example, the oversampled preamble sequence may be obtained by repeating each element of a preamble oversampling ratio (OSR).

The cyclic shift sequence may be obtained as a cyclic shift of the oversampled preamble sequence by a half-period number of samples. The half-period number may be equal to a product of a multiplication of an OSR and a half of a preamble length.

Dissimilar to a conventional mechanism, such a mechanism proposed herein may be used to estimate a CFO and compensate the CFO by overcoming a limitation in a range, for example, −15.625 kHz to +15.625 kHz.

FIG. 1 is a diagram illustrating an example of a configuration of a receiver configured to compensate a CFO. A receiver 100 illustrated in FIG. 1 may be a coherent receiver complying with an IEEE 802.15.4q standard. However, the receiver 100 is not limited to the example receiver, and may be a coherent receiver in a wireless communication system.

Referring to FIG. 1, the receiver 100 includes a block detector 104, a CFO estimator 106, a CFO compensator 108, a communicator 110, and a storage 112. The block detector 104, the CFO estimator 106, the CFO compensator 108, the communicator 110, and the storage 112 may be coupled to a controller 102.

The block detector 104 coupled to the controller 102 may receive a plurality of discrete time samples. The discrete time samples may include a signal received from a transmitter, for example, a baseband signal. In addition, the block detector 104 may obtain a sample vector from the received discrete time samples.

For convenience of description, the following description is based on a preamble sequence of the IEEE 802.15.4q standard. Such a sequence has a 32-bit length, as follows:
$X_p$={1 0−1 0 0−1 0−1 1 0 1 0 0−1 0 1 1 0 1 0 0−1 0 1−1 0 1 0 0 1 0 1}

The sequence $X_p$ may be divided into a plurality of blocks, for example, four blocks $a_x$, $b_x$, $c_x$, and $d_x$, as follows:
$a_x$={1 0−1 0 0−1 0−1}
$b_x$={1 0 1 0 0−1 0 1}
$c_x$={1 0 1 0 0−1 0 1}
$d_x$={−1 0 1 0 0 1 0 1}

The block $a_x$ may be obtained from first eight elements, for example, a first element through an eighth element. The block $b_x$ may be obtained from next eight elements, for example, a ninth element through 16th element. The block $c_x$ may be obtained from next eight elements, for example, a 17th element through a 24th element. The block $d_x$ may be obtained from next eight elements, for example, a 25th element through a 32th element. Here, $a_x = -d_x$, and $b_x = d_x$.

Such a fact that $a_x = -d_x$ and $b_x = c_x$ may be used to identify a starting point of the block $a_x$ or the block $c_x$ in a stream of samples including the sequence $X_p$. Although described hereinafter, the block detector 104 may use the fact that $a_x = -d_x$ and $b_x = c_x$ to obtain the sample vector from the received discrete time samples.

Here, in the receiver 100, an OSR is assumed to be 1. The OSR refers to a ratio between a bit duration or, a symbol duration and a sampling period. The OSR is defined as a ratio between a sampling frequency and a bit rate. The OSR of 1 in the receiver 100 may indicate that a single sample is obtained per received bit. Hereinafter, a term "bit" and a term "symbol" are used interchangeably throughout the present disclosure. In addition, the received discrete time samples are denoted as a vector r. Thus, the received discrete time samples may correspond to a collection of samples r(1), r(2), buff$_{size}$. Here, buff$_{size}$ denotes a buffer size of the receiver 100.

In a case that $r_{slide}(n)$ denotes a sliding vector, for example, a plurality of sliding vectors, in a sample n, $r_{slide}(n)$ may be obtained by collecting the received discrete time samples, for example, r(n) through r(n+OSR−1). Under the assumption of the OSR being 1, $r_{slide}(n)$ may include 32 samples. By dividing $r_{slide}(n)$ into at least four sub-blocks, sub-blocks $r_a(n)$, $r_b(n)$, $r_c(n)$, and $r_d(n)$ may be obtained. Here, a length of each of the sub-blocks $r_a(n)$, $r_b(n)$, $r_c(n)$, and $r_d(n)$ may be 8×OSR. The sub-block $r_a(n)$ may be obtained by collecting the first 8×OSR number of samples of $r_{slide}(n)$. The sub-block $r_b(n)$ may be obtained by collecting the second 8×OSR number of samples of $r_{slide}(n)$. The sub-block $r_c(n)$ may be obtained by collecting the third 8×OSR number of samples of $r_{slide}(n)$. Theسسsub-block $r_d(n)$ may be obtained by collecting the fourth 8×OSR number of samples of $r_{slide}(n)$. The sub-blocks $r_a(n)$, $r_b(n)$, $r_c(n)$, and $r_d(n)$ may correspond to $a_x$, $b_x$, $c_x$, and $d_x$, respectively.

The block detector 104 coupled to the controller 102 may detect a block by performing a sliding window correlation, as represented by Equations 8 and 9.

$$bd_{index} = \text{argmax}_n\{\sigma(n)\} \quad \text{[Equation 8]}$$

$$\sigma(n) = \text{abs}(r_a(n) \cdot r_d^*(n)) + \text{abs}(r_b(n) \cdot r_c^*(n)) \quad \text{[Equation 9]}$$

In Equation 9, $r_a(n) \cdot r_d^*(n)$ denotes an inner product, or a dot product, between $r_a(n)$ and $r_d^*(n)$. $\sigma(n)$ denotes a correlation coefficient for $r_{slide}(n)$.

The sample vector may be obtained as $r_{slide}(bd_{index})$ corresponding to $\sigma(bd_{index})$. The sample vector $r_{slide}(bd_{index})$ may have a greatest value among all correlation coefficients, for example, $\sigma(n)$ in which $n = 1, 2, \ldots$. Here, $r_a(bd_{index}) = r_d^*(bd_{index})$ and $r_b(bd_{index}) = r_c^*(bd_{index})$, and thus $\sigma(bd_{index})$ may be greatest among all the correlation coefficients, for example, $\sigma(n)$ in which $n = 1, 2, \ldots$.

The sample vector may be used to estimate a CFO. Here, for notational convenience, the sample vector $r_{slide}(bd_{index})$ is denoted as $r_{samp}$, and $r_{samp}(k)$ denotes a kth element of the sample vector.

A period of a 32 preamble length in the IEEE 802.15.4q standard is 32 μs. The period may limit a maximum range of the CFO estimates to ±15.625 kHz. However, a range required by the IEEE 802.15.4q standard is ±192 kHz. The maximum range of the CFO estimates not meeting such a standard requirement may be overcome by identifying a sub-period in a preamble, for example, $X_p$. To meet the standard requirement, a 2 μs sub-period may need to be identified in the preamble. The receiver 100 may identify a sub-period, for example, $T_s$ of 2 μs ($T_s = 2$ μs), of two bits in; by identifying specific elements of the preamble sequence $X_p$. The identifying of a sub-period will be described in detail hereinafter.

The preamble sequence $X_p$ may be as follows:
X = {1 0–1 0 0–1 0–1 1 0 1 0 0–1 0 1 1 0 1 0 0–1 0 1–1 0 1 0 0 1 0 1}

A portion of the elements of $X_p$ may be multiplied by an element, for example, an alternate element, positioned two shifts on a right side of the portion of the elements to generate a positive product. For example, a product of $X_p(6) \times X_p(8)$ is a positive value. For example, $-1 \times -1 = +1$. In addition, a product of each of $X_p(9) \times X_p(11)$, $X_p(17) \times X_p(19)$, and $X_p(30) \times X_p(32)$ is a positive value. Here, the receiver 100 may obtain a set including an index of each of $X_p(6)$, $X_p(9)$, $X_p(17)$, and $X_p(30)$, for example, $S_p = \{6, 9, 17, 30\}$.

In addition, a portion of the elements of $X_p$ may be multiplied by an element, for example, an alternate element, positioned two shifts on a right side of the portion of the elements to generate a negative product, e.g., a product of $X_p(1) \times X_p(3)$ is a negative value. For example, $1 \times -1 = -1$. In addition, a product of each of $X_p(14) \times X_p(16)$, $X_p(22) \times X_p(24)$, and $X_p(25) \times X_p(27)$ is a negative value. The receiver 100 may obtain a set including an index of each of $X_p(1)$, $X_p(14)$, $X_p(22)$, and $X_p(25)$, for example, $S_m = \{1, 14, 22, 25\}$.

An element corresponding an index included in the set $S_p$ may be separated from an alternate element by $T_s = 2$ μs, and an element corresponding to an index included in the set $S_m$ may be separated from an alternate element by $T_s = 2$ μs. Thus, the receiver 100 may identify a sub-period of 2 μs between some of the elements in the preamble of the period 32 μs.

When each element corresponding to an index included in each of the two sets $S_p$ and $S_m$ is multiplied by each alternate element, eight products may be generated. Although described hereinafter, such eight products may be used to estimate a CFO from the received discrete time samples.

When an angle between elements, or samples, having the sub-period of 2 μs is ($\varphi_2$, an estimative CFO range may be expended based on the angle $\varphi_2$. Hereinafter, calculating the angle $\varphi_2$ will be described.

Referring to Equation 7 above, a CFO associated with $\varphi_2$ may be represented by Equation 11.

$$\delta f = \frac{-\text{angle}\{\varphi_2\}}{2\pi T} \quad \text{[Equation 11]}$$

In Equation 11, $\varphi_2$ may be determined based on Equation 12.

$$\varphi_2 = \varphi_{plus} + \varphi_{minus} \quad \text{[Equation 12]}$$

In Equation 12, $\varphi_{plus}$ and $\varphi_{minus}$ denote positive products and negative products, respectively. That is, $\varphi_{plus}$ denotes products of multiplications between the elements corresponding to the indices included in the set $S_p$ and corresponding alternate elements of the elements corresponding to the indices, and $\varphi_{minus}$ denotes products of multiplications between the elements corresponding to the indices included in the set $S_m$ and corresponding alternate elements of the elements corresponding to the indices. $\varphi_{plus}$ may be determined based on Equation 13, and $\varphi_{minus}$ may be determined based on Equation 14.

$$\varphi_{plus} = \tfrac{1}{4} \Sigma_{n \in S_p} r_{samp}(n) \cdot r_{samp}^*(n+2) \quad \text{[Equation 13]}$$

$$\varphi_{minus} = \tfrac{1}{4} \Sigma_{n \in S_m} r_{samp}(n) \cdot r_{samp}^*(n+2) \quad \text{[Equation 14]}$$

In one example, in the receiver 100 using an OSR not being 1, Equation 13 may be represented by Equation 15, and Equation 14 may be represented by Equation 16.

$$\varphi_{plus} = \frac{1}{4 \times OSR} \sum_{n \in S_p} r_{samp}(k_n) \cdot r_{samp}^*(k_n + 2 \times OSR) \quad \text{[Equation 15]}$$

$$\varphi_{minus} = \frac{1}{4 \times OSR} \sum_{n \in S_m} r_{samp}(k_n) \cdot r_{samp}^*(k_n + 2 \times OSR) \quad \text{[Equation 16]}$$

In one example, an index $k_n$ may be represented by Equation 17.

$$k_n = 1 + (n-1) \times OSR \quad \text{[Equation 17]}$$

In one example, the block detector 104 may operate as follows; however, the operation of the block detector 104 is not limited to the following description.

The block detector 104 may obtain the sliding vectors based on the received discrete time samples. The block detector 104 may divide each of the sliding vectors into a plurality of sub-blocks, e.g., the block detector 104 may divide a sliding vector $r_{slide}(n)$ into $r_a(n)$, $r_b(n)$, $r_c(n)$, and $r_d(n)$. The block detector 104 may calculate a correlation coefficient for each of the sliding vectors, e.g., the block detector 104 may calculate a correlation coefficient $\sigma(n)$ for the sliding vector $r_{slide}(n)$ by adding an absolute value of a dot product between $r_a(n)$ and $r_d^*(n)$ (or $r_d(n)$) and an absolute value of a dot product between $r_b(n)$ and $r_c^*(n)$ (or $r_c(n)$). Similarly, the block detector 104 may calculate a correlation coefficient for a remaining sliding vector. Thus, a plurality of correlation coefficients may be calculated. The block detector 104 may determine a maximum value among the correlation coefficients. The maximum value may be, for example, $\sigma(bd_{index})$. In such an example, the block detector 104 may determine $r_{slide}(bd_{index})$ to be a sample vector $r_{samp}$.

The block detector 104 may identify similar elements in the sample vector $r_{samp}$ and elements at an opposite polarity that are separated from the similar elements by a certain time duration in order to identify a sub-period. Here, a product of a multiplication of each of the similar elements and each of the elements at the opposite polarity corresponding to each of the similar elements that is separated from a corresponding similar element by the time duration may be a positive value or a negative value. For example, when $r_{samp}$ is $\{1\ 0{-}1\ 0\ 0{-}1\ 0{-}1\ 1\ 0\ 1\ 0\ 0{-}1\ 0\ 1\ 1\ 0\ 1\ 0\ 0{-}1\ 0\ 1{-}1\ 0\ 1\ 0\ 0\ 1\ 0\ 1\}$, the block detector 104 may verify that a positive value, for example, 1, may be obtained when each of 6th, 9th, 17th, and 30th elements is multiplied by a corresponding element separate on a right side of each of the 6th, 9th, 17th, and 30th elements by a distance of 2. Also, the block detector 104 may verify that a negative value, for example, $-1$, may be obtained when each of 1st, 14th, 22th, and 25th elements is multiplied by a corresponding element separate on a right side of each of the 1st, 14th, 22th, and 25th elements by a distance of 2. The block detector 104 may determine the 6th, 9th, 17th, and 30th elements, and the 1st, 14th, 22th, and 25th elements to be the similar elements. Also, the block detector 104 may determine, to be the elements at the opposite polarity, the elements separate from the similar elements on a right side of each of the similar elements by a distance of 2. When the similar elements and the elements at the opposite polarity are identified, the block detector 104 may determine, to be the sub-period, 2 μs corresponding to the distance 2 between each of the similar elements and each of the corresponding elements at the opposite polarity or corresponding to a time duration corresponding to the distance 2.

The block detector 104 may determine the sets $S_p$ and $S_m$, e.g., the block detector 104 may determine the set $S_p$ including respective indices of the 6th, 9th, 17th, and 30th elements, $S_p=\{6, 9, 17, 30\}$, and the set $S_m$ including respective indices of the 1st, 14th, 22th, and 25th elements, $S_m=\{1, 14, 22, 25\}$.

The block detector 104 may calculate $\varphi_{plus}$ based on the sample vector and the set $S_p$, and $\varphi_{minus}$ based on the sample vector and the set $S_m$, e.g., the block detector 104 may calculate $\varphi_{plus}$ based on Equation 13 or 15, and $\varphi_{minus}$ based on Equation 14 or 16. The block detector 104 may calculate $\varphi_2$ based on $\varphi_{plus}$ and $\varphi_{minus}$. Hereinafter, the CFO estimator 106 will be described.

In one example, the CFO estimator 106 coupled to the controller 102 may obtain a plurality of tentative CFO estimates based on the sample vector. Each of the CFO estimates may be associated with a compensation coefficient. The CFO estimator 106 may select, as a CFO, a tentative CFO estimate having a greatest compensation coefficient from the tentative CFO estimates.

A CFO estimate obtained based on Equation 11 using the angle $\varphi_2$ may not be sufficiently reliable in, for example, a low signal-to-noise ratio (SNR) regime. However, a reliability of the CFO estimate may be improved by using a greater angle, for example, $\varphi_T = \varphi_{32}$, between samples separated by a time duration equal to the preamble period. Here, $\varphi_{32}$ may be calculated using the full preamble period and may not need timing information dissimilar to the calculating of $\varphi_2$, and thus the angle $\varphi_{32}$ between the samples separated by the time duration equal to the preamble period, for example, 32 μs, may have a greater reliability compared to $\varphi_2$.

In one example, $\varphi_2$ may be adjusted based on $\varphi_{32}$. Although described hereinafter, $\varphi_2$ may be adjusted to be $\varphi_{2,a_x}^h$ and $\varphi_{2,c_x}^h$, in which $h \in [1, 3]$. That is, $\varphi_2$ may be adjusted to be six angles. Hereinafter, the adjusting of $\varphi_2$ will be described in detail.

First, $\varphi_{32}$ may be determined based on Equation 18.

$$\varphi_{32} = \angle\{r_{samp}(k_n) \cdot r_{samp}^*(k_n+32\times OSR)\} \quad \text{[Equation 18]}$$

In a communication system, the preamble sequence $X_p$ may be repeated by multiple times as specified in the standard, and thus Equation 18 may be maintained.

A relationship between $\varphi_2$ and $\varphi_{32}$ may be represented by Equation 19.

$$\varphi_{32} + 2n\pi = R_a \varphi_2 \quad \text{[Equation 19]}$$

In Equation 19, $$R_a = \frac{T}{T_S} = \frac{32\mu S}{2\mu S} = 16.$$

In Equation 19, n denotes an integer. To adjust $\varphi_2$, the CFO estimator 106 and/or the controller 102 may calculate values corresponding to n in Equation 19, for example, $n_1^{a_x}$, $n_2^{a_x}$ and $n_3^{a_x}$. For example, the CFO estimator 106 and/or the controller 102 may calculate $n_1^{a_x}$ based on Equation 20, $n_2^{a_x}$ based on Equation 21, and $n_3^{a_x}$ based on Equation 22.

$$n_1^{a_x} = \text{round}(n^{a_x}) - 1 \quad \text{[Equation 20]}$$

$$n_2^{a_x} = \text{round}(n^{a_x}) \quad \text{[Equation 21]}$$

$$n_3^{a_x} = \text{round}(n^{a_x}) + 1 \quad \text{[Equation 22]}$$

In Equations 20, 21, and 22, $n_{ax}$ may be determined based on Equation 23.

$$n^{a_x} = \frac{16\varphi_2^{a_x} - \varphi_{32}}{2\pi} \quad \text{[Equation 23]}$$

In Equation 23, $\varphi_2^{a_x} = \varphi_2$. That is, a first angle $\varphi_2^{a_x}$ may be $\varphi_2$.

In addition, to adjust $\varphi_2$, the CFO estimator 106 and/or the controller 102 may calculate values corresponding to n in Equation 19, for example, $n_1^{c_x}$, $n_2^{c_x}$, and $n_3^{c_x}$. For example, the CFO estimator 106 and/or the controller 102 may calculate $n_1^{c_x}$ based on Equation 24, $n_2^{c_x}$ based on Equation 25, and $n_3^{c_x}$ based on Equation 26.

$$n_1^{c_x} = \text{round}(n^{c_x}) - 1 \quad \text{[Equation 24]}$$

$$n_2^{c_x} = \text{round}(n^{c_x}) \quad \text{[Equation 25]}$$

$$n_3^{c_x} = \text{round}(n^{c_x}) + 1 \quad \text{[Equation 26]}$$

In Equations 24, 25, and 26, $n^{c_x}$ may be determined based on Equation 27.

$$n^{c_x} = \frac{16\varphi_2^{c_x} - \varphi_{32}}{2\pi} \quad \text{[Equation 27]}$$

In Equation 27, $\varphi_2^{c_x} = \varphi_2^{a_x}$. That is, a second angle $\varphi_2^{c_x}$ may be a negative value opposite to the first angle $\varphi_2^{a_x}$.

In one example, Equations 20 through 23 may correspond to the block $a_x$ or $\varphi_2^{a_x}$ described along with the block detector 104, and Equations 25 through 27 may correspond to the block $c_x$ or $\varphi_2^{c_x}$ described along with the block detector 104.

The tentative CFO estimates may be obtained based on Equation 28.

$$\delta f_{a_x}^h = \frac{-\varphi_{2,a_x}^h}{2\pi T_s}, \delta f_{c_x}^h = \frac{-\varphi_{2,c_x}^h}{2\pi T_s} \quad \text{[Equation 28]}$$

In Equation 28, $\varphi_{2,a_x}^h$ and $\varphi_{2,c_x}^h$ may be determined based on Equation 29 and 30, respectively.

$$\varphi_{2,a_x}^h = \frac{\varphi_{32} + 2n_h^{a_x}\pi}{16}, h \in [1, 3]. \quad \text{[Equation 29]}$$

$$\varphi_{2,c_x}^h = \frac{\varphi_{32} + 2n_h^{c_x}\pi}{16}, h \in [1, 3]. \quad \text{[Equation 30]}$$

When $n_1^{a_x}$, $n_2^{a_x}$, $n_3^{a_x}$, $n_1^{c_x}$, $n_2^{c_x}$, and $n_3^{c_x}$ are calculated, $\varphi_2$ may be adjusted to be the angles, for example, $\varphi_{2,a_x}^h$ and $\varphi_{2,c_x}^h$, based on Equations 29 and 30. In addition, the tentative CFO estimates may be calculated based on the angles.

The CFO estimator 106 may operate as follows. However, the operation of the CFO estimator 106 is not limited to the following description.

The CFO estimator 106 may obtain, as the first angle, an angle between elements of the sample vector and obtain, as the second angle, a negative value opposite to the first angle, e.g., the CFO estimator 106 may determine the angle $\varphi_2$ to be the first angle $\varphi_2^{a_x}$, and the negative value opposite to the first angle $\varphi_2^{a_x}$ to be the second angle $\varphi_2^{c_x}$.

The CFO estimator 106, or the controller 102, may calculate $n^{ax}$ based on the first angle and the preamble angle $\varphi_{32}$. An example of $n_{ax}$ is as follows:

$$n^{a_x} = \frac{16\varphi_2^{a_x} - \varphi_{32}}{2\pi}$$

The CFO estimator 106, or the controller 102, may calculate a plurality of first integers based on $n_{ax}$. Examples of the first integers are as follows: $n_1^{a_x}=\text{round}(n^{a_x})-1$, $n_2^{a_x}=\text{round}(n^{a_x})$, and $n_3^{a_x}=\text{round}(n^{a_x})+1$ The CFO estimator 106, or the controller 102, may calculate $n^{cx}$ based on the second angle and the preamble angle $\varphi_{32}$. An example of $n^{cx}$ is as follows:

$$n^{c_x} = \frac{16\varphi_2^{c_x} - \varphi_{32}}{2\pi}$$

The CFO estimator 106, or the controller 102, may calculate a plurality of second integers based on $n^{cx}$. Examples of the second integers are as follows: $n_1^{c_x}=\text{round}(n^{c_x})-1$, $n_2^{c_x}=\text{round}(n^{c_x})$, and $n_3^{c_x}=\text{round}(n^{c_x})+1$ The CFO estimator 106 may determine the angles based on the preamble angle $\varphi_{32}$. Examples of the angles are as follows:

$$\varphi_{2,a_x}^1 = \frac{\varphi_{32} + 2n_1^{a_x}\pi}{16}, \varphi_{2,a_x}^2 = \frac{\varphi_{32} + 2n_2^{a_x}\pi}{16}, \varphi_{2,a_x}^3 = \frac{\varphi_{32} + 2n_3^{a_x}\pi}{16},$$

$$\varphi_{2,c_x}^1 = \frac{\varphi_{32} + 2n_1^{c_x}\pi}{16}, \varphi_{2,c_x}^2 = \frac{\varphi_{32} + 2n_2^{c_x}\pi}{16},$$

and $$\varphi_{2,c_x}^3 = \frac{\varphi_{32} + 2n_3^{c_x}\pi}{16}.$$

The CFO estimator 106 may determine the tentative CFO estimates based on the obtained angles and the sub-period, e.g., the CFO estimator 106 may obtain the tentative CFO estimates by dividing each of $\varphi_{2,a_x}^1$, $\varphi_{2,a_x}^2$, $\varphi_{2,a_x}^3$, $\varphi_{2,c_x}^1$, $\varphi_{2,c_x}^2$, and $\varphi_{2,c_x}^3$ by $2\pi T_s$.

Examples of the tentative CFO estimates are as follows:

$$\delta f_{a_x}^1 = \frac{-\varphi_{2,a_x}^1}{2\pi T_s}, \delta f_{a_x}^2 = \frac{-\varphi_{2,a_x}^2}{2\pi T_s}, \delta f_{a_x}^3 = \frac{-\varphi_{2,a_x}^3}{2\pi T_s}, \delta f_{c_x}^1 = \frac{-\varphi_{2,c_x}^1}{2\pi T_s},$$

$$\delta f_{c_x}^2 = \frac{-\varphi_{2,c_x}^2}{2\pi T_s}, \delta f_{c_x}^3 = \frac{-\varphi_{2,c_x}^3}{2\pi T_s}$$

Hereinafter, the CFO compensator 108 will be described in detail.

In one example, the CFO compensator 108 and/or the controller 102 may compensate the sample vector using the tentative CFO estimates, or at least one CFO estimate, to obtain at least one compensated vector.

Compensated vectors, for example, $$r_{\delta f_{a_x}^h}^{a_x} \text{ and } r_{\delta f_{a_x}^h}^{c_x},$$

may be obtained from Equations 29 through 32, in which $h \in [1, 3]$. Here, a compensated vector of a kth element is assumed to be $$r_{\delta f_h^h}^{a_x}(k).$$

The compensated vector $$r_{\delta f_h^h}^{a_x}$$

may be obtained based on Equation 31, and the compensated vector $$r_{\delta f_h^h}^{c_x}$$

may be obtained based on Equation 32.

$$r_{\delta f_{a_x}^h}^{a_x}(n) = r_{samp}(n)e^{-j \times 2\times \pi \times \delta f_{a_x}^h \times n}, h \in [1, 3] \quad \text{[Equation 31]}$$

$$r_{\delta f_{c_x}^h}^{c_x}(n) = r_{samp}(n)e^{-j \times 2\times \pi \times \delta f_{c_x}^h \times n}, h \in [1, 3] \quad \text{[Equation 32]}$$

In one example, the CFO estimator 106 and/or the controller 102 may calculate a compensation coefficient corresponding to each of the compensated vectors. The CFO estimator 106 and/or the controller 102 may calculate the compensation coefficient based on Equations 33 and 34.

$$corr_{\delta f_{est}} = \sum_{n=1}^{N} r_{\delta f_{a_x}^h}^{a_x}(n) \cdot x_p^{os}(n), \delta f_{est} \in \{\delta f_{a_x}^h, h \in [1, 3]\} \quad \text{[Equation 33]}$$

-continued $$corr_{\delta f_{est}} = \sum_{n=1}^{N} r_{\delta f_{c_x}^h}^{c_x}(n) \cdot x_{p+16OSR}^{os}(n),$$  [Equation 34]

$$\delta f_{est} \in \{\delta f_{c_x}^h, h \in [1, 3]\}$$

A length of a vector $corr_{\delta f_{est}}$ may be equal to the number of the tentative CFO estimates. In Equations 33 and 34, $x_p^{os}(n)$ denotes an oversampled preamble sequence, and $x_{p+16OSR}^{OS}$ denotes an oversampled preamble that is circularly or cyclically shifted by half a length of the oversampled preamble sequence.

In addition, the CFO estimator 106 and/or the controller 102 may select, as the CFO, one of the tentative CFO estimates. For example, the CFO estimator 106 and/or the controller 102 may select, as the CFO, a tentative CFO estimate for a corresponding compensated vector having a greatest compensation coefficient from the tentative CFO estimates.

The selected CFO, $\delta f_{estimate}$, may be represented by Equation 35.

$$\delta f_{estimate} = \mathrm{argmax}_{\delta f_{est} \in \{\delta f_{a_x}^h, \delta f_{c_x}^h, h \in [1,3]\}} \{corr_{\delta f_{est}}\}$$

In one example, the controller 102 coupled to the CFO compensator 108 may compensate the CFO in the received discrete time samples. However, examples are not limited to the example described in the foregoing, and the CFO compensator 108 may compensate the CFO in the received discrete time samples. The range h∈[1,3] may be expanded for a greater reliability. The range h∈[1,3] may be used solely for the purpose of description, and thus the range is not limited to the example described in the foregoing. For example, in Equations 20 through 23, $n_1^{a_x}$=round($n^{a_x}$-2, $n_2^{a_x}$=round($n^{a_x}$)-1, $n_3^{a_x}$=round($n^{a_x}$), $n_4^{a_x}$=round($n^{a_x}$)+1, and =$n_5^{a_x}$=round($n^{a_x}$)+2 may be used in place of $n_1^{a_x}$, $n_2^{a_x}$, and $n_3^{a_x}$. Similarly, in a case that h∈[1,5], $n_1^{c_x}$, $n_2^{c_x}$, $n_3^{c_x}$, $n_4^{c_x}$, and $n_5^{c_x}$ may be used. In the case that h∈[1,3], six tentative CFO estimates may be determined. In the case that the h∈[1,5], ten tentative CFO estimates may be determined. In addition, h may include an odd number of elements, for example, h={1, 2, 3}, h={1, 2, 3, 4, 5}, and h={1, 2, 3, 4, 5, 6, 7}.

When the CFO $\delta f_{estimate}$ is obtained, the CFO may be compensated based on $r_{comp}(n)=r(n)e^{-j \times 2 \times \pi \times \delta f_{estimate} \times n}$. Here, $r_{comp}(n)$ denotes an nth element of the compensated received discrete time samples $r_{comp}$.

In one example, the communicator 110 of the receiver 100 may provide a communication interface among the controller 102, the block detector 104, the CFO estimator 106, and the CFO compensator 108, and the storage 112.

The storage 112 may include at least one computer-readable storage medium. The storage 112 may include nonvolatile storage elements.

Figure 2:
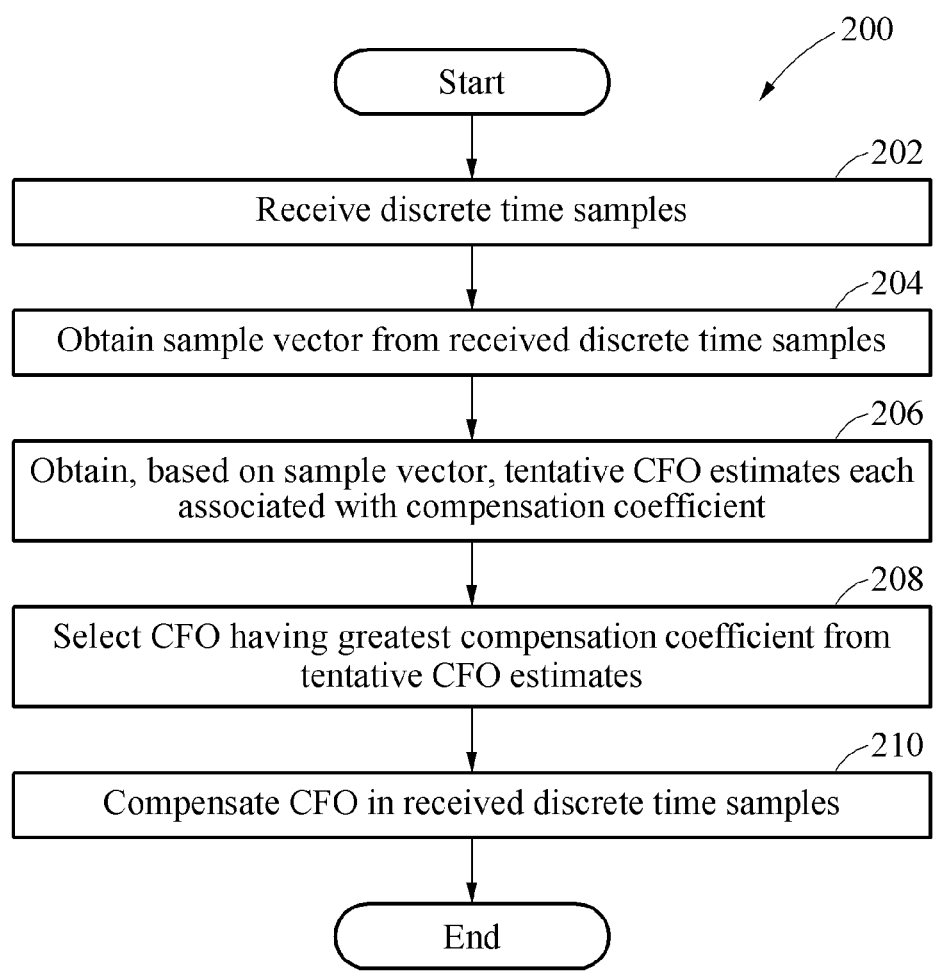
FIG. 2 is a flowchart illustrating an example of a method of compensating a CFO.

FIG. 2 is a flowchart illustrating an example of a method 200 of compensating a CFO. Referring to FIG. 2, in operation 202, the method 200 includes receiving discrete time samples. In one example, in the method 200, the controller 102 and/or the communicator 110 of the receiver 100 may receive the discrete time samples.

In operation 204, the method 200 includes obtaining a sample vector from the received discrete time samples. In one example, in the method 200, the controller 102 and/or the block detector 104 of the receiver 100 may obtain the sample vector from the received discrete time samples.

In operation 206, the method 200 includes obtaining a plurality of tentative CFO estimates based on the sample vector. Each of the tentative CFO estimates may be associated with a compensation coefficient. In one example, in the method 200, the controller 102 and/or the CFO estimator 106 may obtain the tentative CFO estimates based on the sample vector.

In operation 208, the method 200 includes selecting a CFO having a greatest compensation coefficient from the tentative CFO estimates. In one example, in the method 200, the controller 102 and/or the CFO estimator 106 may select the CFO having the greatest compensation coefficient from the tentative CFO estimates.

In operation 210, the method 200 includes compensating the selected CFO in the received discrete time samples. In one example, in the method 200, the controller 102 and/or the CFO compensator 108 may compensate the selected CFO in the received discrete time samples.

The descriptions provided with reference to FIG. 1 may be applicable to the operations described with reference to FIG. 2, and thus a more detailed and repeated description will be omitted here for brevity.

Figure 3:
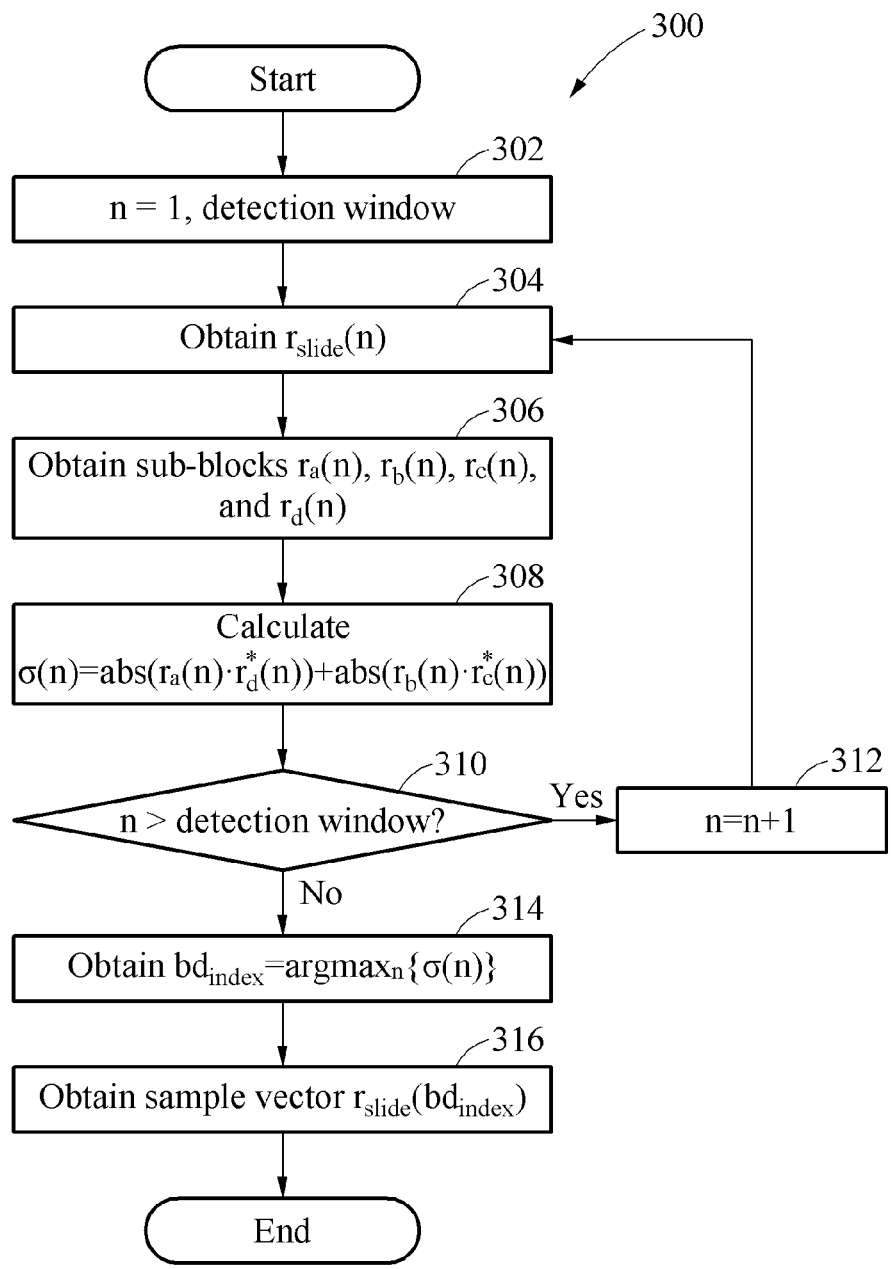
FIG. 3 is a flowchart illustrating an example of a method of obtaining a sample vector using a block detector.

FIG. 3 is a flowchart illustrating an example of a method 300 of obtaining a sample vector using a block detector. Referring to FIG. 3, in operation 302, the method 300 includes assigning 1 to n (n=1) with respect to received discrete time samples in a detection window associated with the block detector 104 of the receiver 100. In one example, in the method 300, the controller 102 and/or the block detector 104 of the receiver 100 may assign 1 to n (n=1) with respect to the received discrete time samples in the detection window.

In operation 304, the method 300 includes obtaining $r_{slide}(n)$ from the received discrete time samples. In one example, in the method 300, the controller 102 and/or the block detector 104 may obtain $r_{slide}(n)$ from the received discrete time samples.

In operation 306, the method 300 includes obtaining at least four sub-blocks $r_a(n)$, $r_b(n)$, $r_c(n)$, and $r_d(n)$ by dividing each sliding vector into at least four sub-blocks. That is, the method 300 may include dividing $r_{slide}(n)$ and obtaining $r_a(n)$, $r_b(n)$, $r_c(n)$, and $r_d(n)$. In an example, in the method 300, the controller 102 and/or the block detector 104 may obtain the four sub-blocks $r_a(n)$, $r_b(n)$, $r_c(n)$, and $r_d(n)$.

In operation 308, the method 300 includes calculating a correlation $\sigma(n)$=abs($r_a(n) \cdot r_d^*(n)$)+abs($r_b(n) \cdot r_c^*(n)$). In one example, in the method 300, the controller 102 and/or the block detector 104 may calculate the correlation $\sigma(n)$=abs $r_a \cdot r_d^*(n)$)+abs($r_b(n) \cdot r_c^*(n)$).

In operation 310, the method 300 includes determining whether n is greater than the detection window (n>detection window). In operation 312, in response to n being greater than the detection window, the method 300 includes assigning n+1 to n (n=n+1).

In operation 314, in response to n not being greater than the detection window, the method 300 includes obtaining $bd_{index}=\mathrm{argmax}_n\{\sigma(n)\}$.

In operation 316, the method 300 includes obtaining a sample vector $r_{slide}(bd_{index})$.

Figure 4:
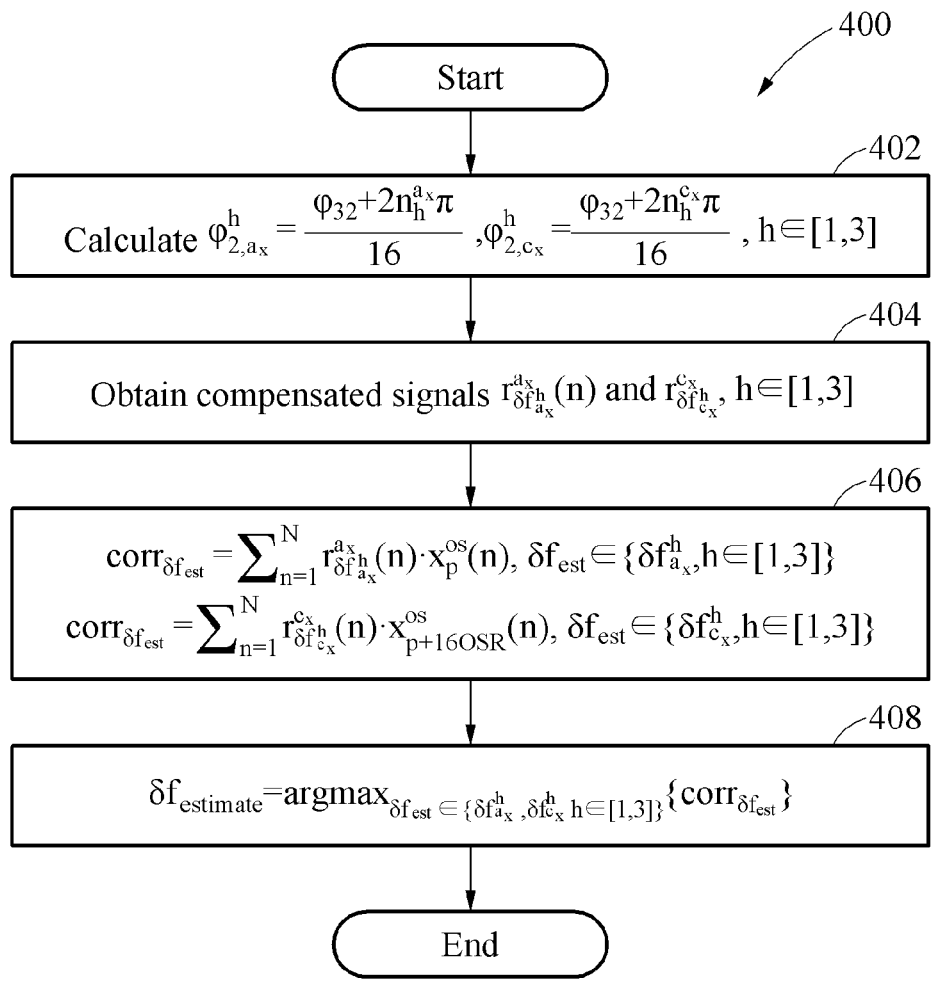
FIG. 4 is a flowchart illustrating an example of a method of estimating a CFO using a CFO estimator.

FIG. 4 is a flowchart illustrating an example of a method 400 of estimating a CFO using a CFO estimator. The method 400 of estimating a CFO to be described hereinafter may be performed by the controller 102. However, examples may not be limited to the illustrated example, and thus the method 400 may be performed by the CFO estimator 106 and/or the controller 102.

Referring to FIG. 4, in operation 402, the method 400 includes calculating $$\varphi_{2,a_x}^h = \frac{\varphi_{32} + 2n_h^{a_x}\pi}{16}, \varphi_{2,c_x}^h = \frac{\varphi_{32} + 2n_h^{c_x}\pi}{16}, h \in [1,3].$$

Here, $\varphi_{2,a_x}{}^h$ denotes angles corresponding to a sub-block $a_x$ or $\varphi_2^{a_x}$ in a case that h∈[1,3], and $\varphi_{2,c_x}{}^h$ denotes angles corresponding to a sub-block $c_x$ or $\varphi_2^{c_x}$ in the case that h∈[1,3].

In operation 404, the method 400 includes obtaining compensated signals $$r_{\delta f_{a_x}^h}^{a_x}(n) \text{ and } r_{\delta f_{a_x}^h}^{c_x}(n).$$

Here, h∈[1,3].

In operation 406, the method 400 includes performing the following two sets of correlation.

$$corr_{\delta f_{est}} = \sum_{n=1}^{N} r_{\delta f_{a_x}^h}^{a_x}(n) \cdot x_p^{os}(n), \delta f_{est} \in \{\delta f_{a_x}^h, h \in [1,3]\}$$

and $$corr_{\delta f_{est}} = \sum_{n=1}^{N} r_{\delta f_{c_x}^h}^{c_x}(n) \cdot x_{p+16OSR}^{os}(n), \delta f_{est} \in \{\delta f_{c_x}^h, h \in [1,3]\}$$

In a case that OSR is 1 (OSR=1), the following two sets of correlation may be performed.

$$corr_{\delta f_{est}} = \sum_{n=1}^{N} r_{\delta f_{a_x}^h}^{a_x}(n) \cdot x_p(n), \delta f_{est} \in \{\delta f_{a_x}^h, h \in [1,3]\}$$

and $$corr_{\delta f_{est}} = \sum_{n=1}^{N} r_{\delta f_{c_x}^h}^{c_x}(n) \cdot x_{p+16}(n), \delta f_{est} \in \{\delta f_{c_x}^h, h \in [1,3]\}$$

In operation 408, the method 400 includes obtaining a CFO estimate $$\delta f_{estimate} = \mathrm{argmax}_{\delta f_{est} \in \{\delta f_{a_x}^h, \delta f_{c_x}^h, h \in [1,3]\}} \{corr_{\delta f_{est}}\}.$$

Figure 5:
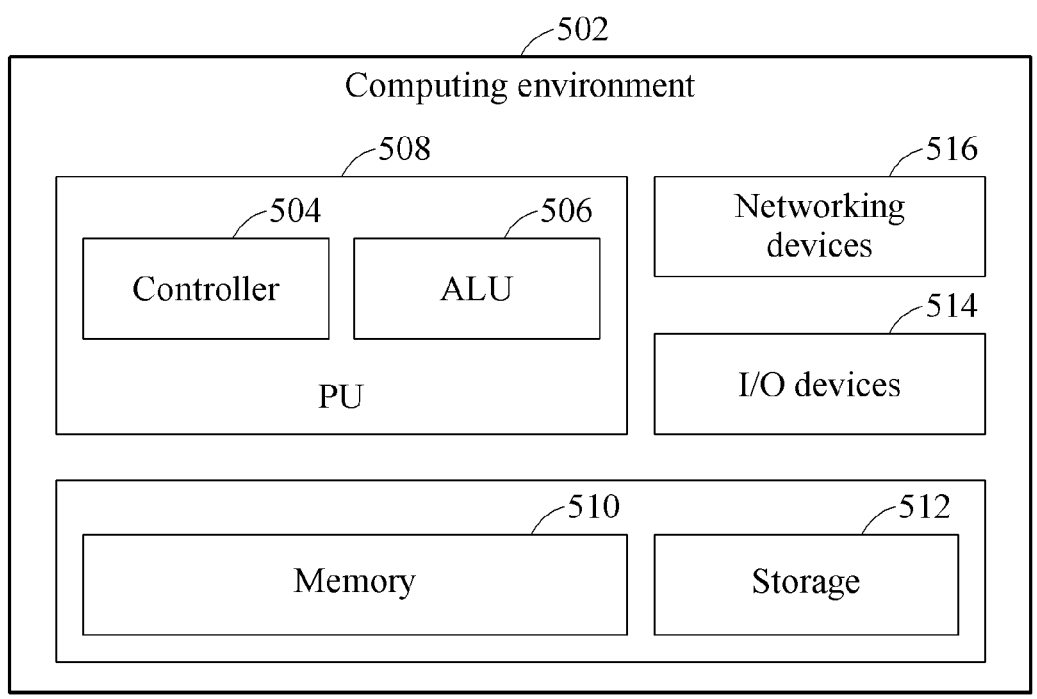
FIG. 5 is a diagram illustrating an example of a computing environment to embody a method of compensating a CFO in a receiver.

FIG. 5 is a diagram illustrating an example of a computing environment 502 to embody a method of compensating a CFO in a receiver. Referring to FIG. 5, the computing environment 502 includes at least one processing unit (PU) including a controller 504 and an arithmetic logic unit (ALU) 506, a memory 510, a storage 512, a plurality of networking devices 516, and a plurality of input and output (I/O) devices 514. The PU 508 may process instructions for the method. The PU 508 may receive commands from the controller 504 to perform processing. In addition, any logical and arithmetical operations involved in execution of the instructions may be computed or calculated with a help of the ALU 506.

The overall computing environment 502 may include a plurality of homogeneous or heterogeneous cores, different types of central processing units (CPUs), special media, and other accelerators. The PU 508 may process the instructions for the method. In addition, a plurality of PUs may be positioned on a single bit or over multiple bits.

A method including codes and instructions needed for implementation or execution may be stored in either the memory 510 or the storage 512, or both the memory 510 and the storage 512. At a time of the execution, a necessary instruction may be retrieved from a corresponding memory or storage, and executed by the PU 508.

The controller, the block detector, the CFO estimator, the CFO compensator, the communicator, the computing environment, and the processor illustrated in FIGS. 1 and 5 that perform the operations described herein with respect to FIGS. 2, 3, and 4 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 3, and 4. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3, and 4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to compensate a carrier frequency offset (CFO) in a receiver, the method comprising:
    receiving discrete time samples;
    obtaining a sample vector from the received discrete time samples;
    obtaining tentative CFO estimates based on the sample vector, wherein each of the tentative CFO estimates is associated with a compensation coefficient; and
    selecting a CFO having a greatest compensation coefficient from the tentative CFO estimates; and
    compensating the CFO in the received discrete time samples.

2. The method of claim 1, wherein the obtaining of the sample vector comprises:
    obtaining sliding vectors from the received discrete time samples;
    dividing each of the sliding vectors into at least four sub-blocks;
    obtaining a correlation coefficient for each of the sliding vectors based on the at least four sub-blocks; and
    selecting, as the sample vector, a sliding vector having a greatest correlation coefficient from the sliding vectors.

3. The method of claim 2, wherein the correlation coefficient for each of the sliding vectors is obtained by adding an absolute value of a dot product between a first sub-block and a fourth sub-block and an absolute value of a dot product between a second sub-block and a third sub-block.

4. The method of claim 1, wherein the obtaining of the tentative CFO estimates comprises:
    obtaining angles corresponding respectively to the tentative CFO estimates; and
    dividing a corresponding angle by a denominator term.

5. The method of claim 4, further comprising:
    obtaining a sub-period by identifying similar elements and elements of an opposite polarity being separated by a time duration equal to the sub-period; and
    obtaining, as the denominator term, a product of a multiplication of a numerical value 2, pi ($\pi$), and the sub-period.

6. The method of claim 4, wherein the obtaining of the angles comprises:
    obtaining, as a first angle of the angles, an angle between elements of the sample vector;
    obtaining, as a second angle of the angles, a negative value opposite to the first angle; and
    obtaining a remaining angle of the angles excluding the first angle and the second angle based on a preamble angle, wherein the preamble angle is an angle between samples separated from one another by a time duration equal to a preamble period.

7. The method of claim 1, wherein the selecting of the CFO comprises:
    obtaining corresponding compensated vectors by compensating the sample vector using the tentative CFO estimates;
    obtaining compensation coefficients corresponding respectively to the corresponding compensated vectors; and
    selecting, as the CFO, one of the tentative CFO estimates for a corresponding compensated vector having a greatest compensation coefficient from the tentative CFO estimates.

8. The method of claim 7, wherein the obtaining of the compensation coefficients comprises:

obtaining first half compensation coefficients corresponding to a first half of the compensation coefficients by correlating first half compensated vectors with an oversampled preamble sequence; and obtaining second half compensation coefficients corresponding to a second half of the compensation coefficients by correlating second half compensated vectors with a cyclic shift sequence.

9. The method of claim 8, wherein the oversampled preamble sequence is obtained by repeating each element of a preamble oversampling ratio (OSR).

10. The method of claim 8, wherein the cyclic shift sequence is obtained as a cyclic shift of the oversampled preamble sequence by a half-period number of samples,
wherein a half-period is equal to a product of a multiplication of an OSR and a half of a preamble length.

11. A non-transitory computer-readable storage medium storing instructions to cause computing hardware to perform the method of claim 1.

12. A receiver configured to compensate a carrier frequency offset (CFO), the receiver comprising:
a processor configured to
receive discrete time samples and obtain a sample vector from the received discrete time samples;
obtain tentative CFO estimates based on the sample vector and select a CFO having a greatest compensation coefficient from the tentative CFO estimates, wherein each of the tentative CFO estimates is associated with a compensation coefficient; and
compensate the CFO in the received discrete time samples.

13. The receiver of claim 12, wherein the processor is further configured to obtain sliding vectors from the received discrete time samples and divide each of the sliding vectors into at least four sub-blocks, obtain a correlation coefficient for each of the sliding vectors based on the at least four sub-blocks, and select, as the sample vector, at least one sliding vector having a greatest correlation coefficient from the sliding vectors.

14. The receiver of claim 12, wherein the correlation coefficient is obtained by adding an absolute value of a dot product between a first sub-block and a fourth sub-block and an absolute value of a dot product between a second sub-block and a third sub-block.

15. The receiver of claim 12, wherein the processor is configured to obtain the tentative CFO estimates by obtaining angles corresponding respectively to the tentative CFO estimates and dividing a corresponding angle by a denominator term.

16. The receiver of claim 15, wherein the processor is further configured to obtain a sub-period by identifying similar elements and elements of an opposite polarity being separated by a time duration equal to the sub-period, and obtain, as the denominator term, a product of a multiplication of a numerical value 2, pi ($\pi$), and the sub-period.

17. The receiver of claim 15, wherein the processor is further configured to obtain an angle between elements of the sample vector as a first angle of the angles and a negative value opposite to the first angle as a second angle of the angles, and obtain a remaining angle of the angles excluding the first angle and the second angle based on a preamble angle,
wherein the preamble angle is an angle between samples separated from one another by a time duration equal to a preamble period.

18. The receiver of claim 12, wherein the processor is further configured to obtain corresponding compensated vectors by compensating the sample vector by the tentative CFO estimates, obtain compensation coefficients corresponding respectively to the corresponding compensated vectors, select, as the CFO, one of the tentative CFO estimates for a corresponding compensated vector having a greatest compensation coefficient, and compensate for the received discrete time samples using the CFO.

19. The receiver of claim 12, wherein the processor is further configured to obtain first half compensation coefficients of the compensation coefficients by correlating first half compensated vectors with an oversampled preamble sequence, and second half compensation coefficients of the compensation coefficients by correlating second half compensated vectors with a cyclic shift sequence.

20. The receiver of claim 19, wherein the oversampled preamble sequence is obtained by repeating each element of a preamble oversampling ratio (OSR).

21. The receiver of claim 19, wherein the cyclic shift sequence is obtained as a cyclic shift of a distributed preamble sequence by a half-period number of samples.

22. The receiver of claim 12, wherein the receiver is in compliance with an Institute of Electrical and Electronics Engineers (IEEE) 802.15.4q standard.

23. The receiver of claim 12, further comprising a memory storing instructions to implement the processor to
receive the discrete time samples and obtain the sample vector from the received discrete time samples;
obtain the tentative CFO estimates based on the sample vector and select the CFO having the greatest compensation coefficient from the tentative CFO estimates, wherein each of the tentative CFO estimates is associated with the compensation coefficient; and
compensate the CFO in the received discrete time samples.

* * * * *